(12) United States Patent
Shami et al.

(10) Patent No.: US 12,244,465 B2
(45) Date of Patent: Mar. 4, 2025

(54) OPTIMIZING THE TRANSFER OF MASSIVE AMOUNTS OF DATA USING AI STRATEGIES

(71) Applicant: Ciena Corporation, Hanover, MD (US)

(72) Inventors: Gauravdeep Singh Shami, Ottawa (CA); Marc Lyonnais, Gatineau (CA); Rodney G. Wilson, Ottawa (CA)

(73) Assignee: Ciena Corporation, Hanover, MD (US)

( * ) Notice: Subject to any disclaimer, the term of this patent is extended or adjusted under 35 U.S.C. 154(b) by 126 days.

(21) Appl. No.: 17/835,072

(22) Filed: Jun. 8, 2022

(65) Prior Publication Data

US 2023/0403197 A1    Dec. 14, 2023

(51) Int. Cl.
*H04L 41/0896* (2022.01)
*H04L 41/16* (2022.01)
*H04L 43/08* (2022.01)
*H04L 47/70* (2022.01)
*H04L 67/141* (2022.01)

(52) U.S. Cl.
CPC .......... *H04L 41/0896* (2013.01); *H04L 41/16* (2013.01); *H04L 43/08* (2013.01); *H04L 47/82* (2013.01); *H04L 67/141* (2013.01)

(58) Field of Classification Search
CPC ..... H04L 41/0896; H04L 41/16; H04L 43/08; H04L 47/92; H04L 67/141
See application file for complete search history.

(56) References Cited

U.S. PATENT DOCUMENTS

| | | | |
|---|---|---|---|
| 9,577,925 B1* | 2/2017 | Bahadur | H04L 45/50 |
| 11,126,929 B2 | 9/2021 | Janulewicz et al. | |
| 2010/0121972 A1* | 5/2010 | Samuels | H04L 47/26 709/234 |
| 2018/0375777 A1* | 12/2018 | Ewert | H04L 41/16 |
| 2021/0021988 A1* | 1/2021 | Boliek | H04L 67/568 |
| 2021/0336896 A1* | 10/2021 | Calmon | H04L 45/16 |
| 2022/0070255 A1* | 3/2022 | Patel | H04L 67/1095 |

OTHER PUBLICATIONS

Yu et al., "SCinet DTN-as-a-Service Framework," pp. 1-22.

* cited by examiner

*Primary Examiner* — Viet D Vu
(74) *Attorney, Agent, or Firm* — Clements Bernard Walker; Christopher L. Bernard

(57) ABSTRACT

Systems and methods for creating and updating data transfer strategies for massive amounts of data are provided. A method, according to one implementation, includes obtaining a first set of parameters pertaining to a data source configured as a first node in a communications system, obtaining a second set of parameters pertaining to a data sink configured as a second node in the communications system, and obtaining a third set of parameters pertaining to a plurality of network elements and links configured along one or more data paths between the data source and data sink. The method also includes the step of automatically creating a high-bandwidth data transfer strategy for transferring a massive amount of data from the data source to the data sink based on the first, second, and third sets of parameters.

21 Claims, 11 Drawing Sheets

OPTIMIZING THE TRANSFER OF MASSIVE AMOUNTS OF DATA USING AI STRATEGIES

TECHNICAL FIELD

The present disclosure generally relates to networking systems and methods. More particularly, the present disclosure relates to Big Data transfers optimizing the transfer of massive amounts of data using Artificial Intelligence (AI) strategies.

BACKGROUND

Generally, the rise of low-latency, high-bandwidth applications has forced network operators to provide innovative solutions to meet customer demands. For example, 800 Gbps per wave at the Physical Layer (i.e., OSI Layer 1) and 400 GE per port at the Data Link Layer (i.e., OSI Layer 2) are quickly becoming the common denominator across communications networks. Concurrently, network edge and core devices are being equipped with additional computational processing capabilities to assist applications, offset centralized cloud computation, and make the infrastructure more intelligent. Edge compute systems are rapidly becoming the point of convergence for High Performance Computing (HPC) and High-Performance Networking (HPN). Multiple high-capacity links are being connected to these edge systems that consist of various Data Processing Units (DPUs), Graphics Processing Units (GPUs), Field Programmable Gate Arrays (FPGAs), and/or other accelerating elements to aid faster data processing and to enhance distributed computing. The Content Delivery Networks (CDNs) for various applications (e.g., Deep Packet Inspection (DPI), etc.), data intensive sciences (e.g., astronomy, particle physics, etc.), and visualization technologies (e.g., augmented reality, virtual reality, etc.) benefit from this evolution in computer communications and network architecture.

These CDNs enable massive flows of data from a Big Data generating application (i.e., host computer) to a destination process (i.e., data sink), where this information is consumed. The data stream may be modified and processed at various points in the network topology, especially since networks are being equipped with supplementary in-network computing. Also, host computers are being fortified with advanced networking capabilities with the evolution of DPUs, smart Network Interface Cards (NICs), and specialized Operating System (OS) kernels. These massive data flows (sometimes referred to as "elephant flows") are extremely latency-sensitive, yet fragile, as they are dependent on host/sink system capabilities and transient characteristics of the infrastructure. For example, the data flows of massive scientific information and research may be extremely time sensitive and fragile as they are dependent on system capabilities and transient characteristics of the infrastructure. Particularly, the host and sink systems, the network, and the intelligent edge compute devices in this case need to be conscious of the data transferring application and act as a unified system to be able to sustain these massive flows. As such, there is therefore a need to address the increased importance of optimizing and orchestrating the entire end-to-end data flow path, including the source and destination host computers themselves, to be able to extract the most real-time bandwidth out of these diverse systems.

In an embodiment, Data Transfer Nodes (DTNs) represent the source and destination host computers and are typically configured as high-end servers equipped with high-speed Network Interface Cards (NICs) dedicated for file transfer between Clouds. Generally, a DTN is utilized as a data source and is configured to generate a massive data transfer event. Another DTN is also utilized as a data sink and is configured to consume the massive amounts of data. DTNs are often used within the Scientific Research and Education Community and are used as vehicles to transport massive amounts of scientific data.

However, any attempts to optimize these massive amounts of data in conventional systems are typically applied manually by system operators, which, as it should be understood, greatly increases the complexity of these operations. Furthermore, many optimizations are dependent on external factors, such as transient load conditions, new releases and protocols, diverse transport mechanisms etc. Thus, the system operators will typically need to frequently tune the DTN systems to achieve adequate capacity.

These manual operations are typically cumbersome and time-consuming for network personnel in order to tune and attempt to optimize the processes to achieve full bandwidth between end-to-end systems. Thus, conventional processes naturally result in increased operational expenses and more man-hours needed to complete data transfer operations regularly. Also, the manual processes are typically difficult to scale in an ever-growing network. It can be difficult for network operators to manually tune and to quickly adapt to changing system conditions, which can thereby lead to frequent sub-optimal performance. Also, when a complex operation of transferring massive amounts of data from one location (e.g., data center) to another is not performed in a sufficient manner, these data transfer operations may sometimes fail and will need additional human involvement to fix the operations, which of course leads to more delay, more man-power, more expense, etc. Therefore, there is a need in the field of data transfer operations, particularly for transferring massive amounts of data, to fully automate this process to achieve adequate, if not optimal, results.

BRIEF SUMMARY

The present disclosure focuses on systems and methods for creating and updating data transfer strategies between any pair of nodes in a communications network for transmitting large amounts of data. According to one implementation, a process for transferring a massive amount of data from one node to another includes a step of obtaining a first set of parameters pertaining to a data source configured as a first node in a communications system. The process also includes the step of obtaining a second set of parameters pertaining to a data sink configured as a second node in the communications system. Also, the process includes obtaining a third set of parameters pertaining to a plurality of network elements and links configured along one or more data paths between the data source and data sink. Furthermore, the process includes the step of automatically creating a high-bandwidth data transfer strategy for transferring a massive amount of data from the data source to the data sink based on the first, second, and third sets of parameters.

In some embodiments, the process may be performed by an edge compute system or other suitable controller and/or flow optimizer. The high-bandwidth data transfer strategy, as described above, may include a procedure of configuring multiple hardware and software settings of the data source, data sink, and applicable network elements and links selected from the plurality of network elements and links. The applicable network elements and links, for example, may include at least in-band network telemetry components and storage devices. The storage devices may include, without limitation, one or more of Non-Volatile Memory Express (NVMe), NVMe-over-Fabrics (NVMeoF), and Remote Direct Memory Access (RDMA). The high-bandwidth data transfer strategy may be an initial data transfer strategy based on an initial state of the data source, data sink, and plurality of network elements and links. In some implementations, the process may further include the step of obtaining real-time parameters during a current data transfer to tune or adjust the multiple hardware and software settings and to perform an auto-scale process based on the size of the communications system.

Also, the tuning or adjusting of the multiple hardware and software settings of the data source and data sink may include a) adjusting a CPU governor setting, b) creating assignments for Non-Uniform Memory Access (NUMA) or a Redundant Array of Independent Disks (RAID), c) controlling Logical Volume Management (LVM) aspects of RAID0 or Non-Volatile Memory Express (NVMe) drives, d) adjusting Peripheral Component Interconnect Express (PCIe) read/write block sizes, e) increasing the operating frequency of a Central Processing Unit (CPU), f) dividing a processing core into multiple units for parallel computation, g) adjusting Transmission Control Protocol (TCP) buffer size based on a bandwidth-delay product, h) adjusting a TCP congestion control algorithm, i) tuning an Operating System (OS) for file transfer, and/or other actions. The action of tuning or adjusting the multiple hardware and software settings of the plurality of network elements and links may include a) tuning network stack settings, b) adjusting Transmission Control Protocol (TCP) buffer sizes based on a bandwidth-delay product, c) adjusting a TCP congestion control algorithm, d) utilizing a fair queueing algorithm, e) utilizing the Maximum Transmission Unit (MTU), f) utilizing packet pacing, g) utilizing alternate routes, h) modifying the Committed Information Rate (CIR), i) modifying the Excess Information Rate (EIR), j) allocating additional data-plane switching resources, k) adjusting Non-Volatile Memory Express over Fiber (NVMeoF) parameters, l) adjusting iperf3 parameters, m) adjusting nuttcp parameters, n) adjusting User Datagram Protocol (UDP) parameters, o) optimizing file batch sizes, p) adjusting transfer sequency parameters, q) adjusting file sizes, and/or other actions.

An orchestration system, according to some embodiments, may include a centralized controller and an Artificial Intelligence (AI)-assisted flow optimizer. The centralized controller, in some cases, may be associated with the processing device, and the AI-assisted flow optimizer may be configured to create an AI model that utilizes the high-bandwidth data transfer strategy described above. In some embodiments, the centralized controller may be configured to extract Performance Metrics (PMs) from ingress ports and egress ports of the data source and data sink and may further be configured to adjudicate real-time modifications of the high-bandwidth data transfer strategy based on AI re-training techniques. The centralized controller may also be configured to fine-tune the data source and data sink by re-training configuration settings of the high-bandwidth data transfer strategy for maximum throughput. Also, the centralized controller may further be configured to implement the re-trained high-bandwidth data transfer strategy for current and future data transfer operations.

In some embodiments, the data source may include one or more high-end servers of a first data center and the data sink may include one or more high-end servers of a second data center. The high-bandwidth data transfer strategy may include transferring the massive amount of data at a speed of hundreds of Gbps from the data source to the data sink. The process may further be defined whereby the high-bandwidth data transfer strategy can perform a step of increasing a data transfer speed beyond a speed typically provided by an operating system associated with one or both of the data source and data sink. The process may further include tuning or adjusting configuration settings of the high-bandwidth data transfer strategy, where the configuration settings may include a) Transmission Control Protocol (TCP) stack settings, b) storage settings, c) congestion control settings, d) Committed Information Rate (CIR) settings, e) Excess Information Rate (EIR) settings, f) Peripheral Component Interface Express (PCIe) settings, g) a number of parallel data paths, h) a block size, i) a file size, and/or other settings.

The first, second, and third sets of parameters may represent baseline information defining the capabilities and potential hurdles of the communications system. The process may further include using the baseline information to register an inventory and topology of the communications system. The first and second sets of parameters, for example, may include a) Operating System (OS) parameters, b) kernel parameters, c) disk Input/Output (I/O) parameters, d) Central Processing Unit (CPU) profile parameters, e) CPU load level parameters, f) CPU temperature parameters, g) Transmission Control Protocol (TCP) parameters, and/or other parameters. The third set of parameters, for example, may include a) latency parameters, b) jitter parameters, c) packet loss parameters, d) link transmission speeds between network elements, e) bandwidth-delay product, f) buffer and queue status parameters, g) contending flows, h) Committed Information Rate (CIR) parameters of network elements, i) Excess Information Rate (EIR) parameters of network elements, j) Maximum Transmission Unit (MTU) size parameters of packets, and/or other parameters. Each of the data source and data sink may include a Network Interface Card (NIC) for implementing the high-bandwidth data transfer strategy to enable transfer of data on the order of zettabytes.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 10 is a screenshot of a UI illustrating an example of object oriented code of a control program of a DTN system, according to various embodiments.

DETAILED DESCRIPTION

Figure 1:
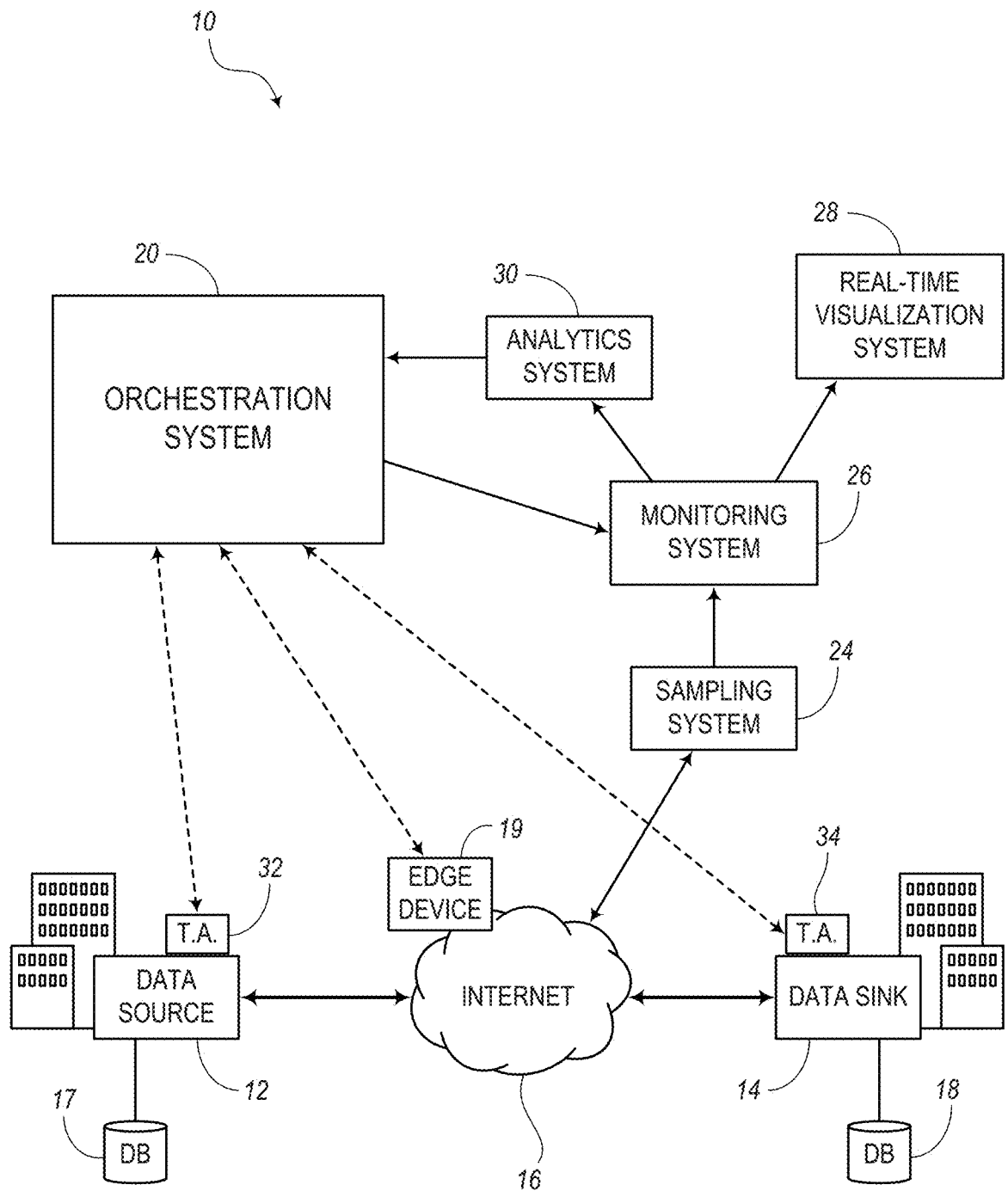
FIG. 1 is a block diagram illustrating a communications system through which Data Transfer Nodes (DTNs) are configured to transfer large amounts of data, according to various embodiments.

The present disclosure relates to systems and methods for transferring extremely large amounts of data from one end of a communications network to another. Solutions provided by the present disclosure are configured to fully automate the optimization process to create data transfer strategies for transferring these massive data flows from a data source to a data sink. Furthermore, using Artificial Intelligence (AI)-assisted flow optimization, the embodiments of the present disclosure are configured to update these data transfer strategies when it is determined that the communications network itself has changed. Thus, the AI-assisted flow optimization is configured to re-train based on current or new system conditions and updates in order to better transfer Big Data according to the current and/or predicted future state of the communications network. It may be noted that the term "optimization" as used in the present disclosure does not necessarily represent an ideal condition, but instead may represent an improved condition or state based on available network metrics.

In particular, the embodiments of the present disclosure related to nodes such as Data Transfer Nodes (DTNs), which are high-end servers equipped with high-speed Network Interface Cards (NICs) dedicated for file transfer between clouds, domains, or other sections of a network or communications system. Also, DTNs are typically used for high-bandwidth data transfers. In this respect, "high-bandwidth" may refer to an amount of data on the order of exabytes (i.e., $10^{18}$ bytes or billions of gigabytes) or zettabytes (i.e., $10^{21}$ bytes or trillions of GBs). As an example, an entire data center containing a massive digital library (e.g., Google, Netflix, etc.) may need to transfer the library from one location (e.g., one part of a country) to another. It may be known that zettabyte transfer is currently in experimental stages but will likely become a reachable goal. At a speed of hundreds of GBs per second (Gbps), the transfer of one zettabyte of data would take days to complete. It may be noted, however, that one error in the conventional processes for transfer Big Data can hang up the whole operation. The embodiments of the present disclosure are configured to optimize this creation of a workable data transfer strategy and to make the operation more resilient and fault-tolerant.

Of note, the present disclosure is described with reference to DTN for illustration purposes. Those skilled in the art will appreciate the present disclosure can be used with other types of nodes, devices, compute resources, etc., and not limited to DTN. That is, a DTN or Data Transfer Node can be any type of node, and the use of the term "node" can be used to indicate a DTN or any other type of server, cluster, device, etc.

A DTN is typically used for the transfer of enormous amounts of scientific data over wide area networks (e.g., the Internet). The DTN may need to utilize various network equipment (e.g., nodes, links, databases, etc.) along with sufficient transfer tools to achieve a high-speed, high-bandwidth data transfer.

Some of the embodiments of the present disclosure are configured to utilize Artificial Intelligence (AI) or Machine Learning (ML) to determine an optimized solution for transferring large amounts of data efficiently, effectively, and quickly. Thus, as opposed to manually determined procedures as used in conventional systems, the present embodiments use automated, AI-assisted techniques to optimize these massive data transfers between a data source and a data sink. In this case, the data source and data sink may be host server systems, where such transfers are end-to-end transfers from the data source to the data sink, traversing through a communications network via various computing, amplifying, storing, and/or accelerating systems.

The data transfer optimization can be achieved by making applications throughout the communications network aware of transient network and system conditions and then optimizing the transfer strategy to adapt to these changes. Depending on the kind of network and types of computing systems and applications using the data, there may be several parameters (e.g., configuration settings) that can be optimized to achieve the maximum effective throughput from the systems exchanging information. However, it may be noted that since "no one size fits all," the systems and methods of the present disclosure are configured to adapt to the particular characteristics of the network and to any changes to the network in real-time.

To achieve guaranteed high disk-to-disk throughput between end systems, the systems and methods of the present disclosure are configured to customize the DTN hardware, Operating System (OS) parameters, software, orchestration stack, data transfer protocol, and/or file management algorithms as needed based on the data source, data sink, and current topology characteristics between the data source and data sink when the data transfer is scheduled to run.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in numerous ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a communications system 10 (or network) through which Data Transfer Nodes (DTNs) are configured to transfer large amounts of data. Again, the DTNs can be any node or type of computing device. The communications system 10 includes a data source 12 configured to transfer a massive amount of data to a data sink 14 via the Internet 16 or another Wide Area Network (WAN). The data source 12 includes one or more databases 17 for storing the large amounts of data. Also, the data sink 14 includes one or more databases 18 for storing the large amounts of data that have been transferred from the data source 12. The communications system 10 may also include one or more edge devices 19 configured on an edge of the Internet 16 for obtaining in-band telemetry metrics regarding the condition of network elements, links, and other components and equipment of the Internet 16, particularly the network components related to one or more paths through which data can be transferred during the massive data transfer event.

Also, the communications system 10 includes an orchestration system 20. The orchestration system 20 is configured to obtain operating characteristics from each of the data source 12 and data sink 14. Also, the orchestration system 20 is configured to obtain operating characteristics of the network equipment of the Internet 16 from the one or more edge devices 19. Utilizing the current operational conditions and settings, the orchestration system 20 is configured to determine a data transfer strategy, which may be optimized (as much as possible) with respect to data volume (or bandwidth), transfer speed, fault tolerance, etc. The data transfer strategy may include adjusting configuration settings for the data source 12, data sink 14, and any intermediate network components (e.g., nodes, links, etc.) to achieve the optimized data transfer. The orchestration system 20 may create an initial data transfer strategy based on currently detected conditions and parameters. Subsequently, the orchestration system 20 is configured to continue to obtain changes to the data source 12, data sink 14, and/or intermediate components, which may result in changes to operating conditions, configurations, and other parameters. With these changes, the orchestration system 20 may be configured to update the configuration settings for the different components as needed to maintain an optimized data transfer solution.

In some embodiments, the communications system 10 may further include a sampling system 24 (e.g., sFlow-RT) configured to obtain samples of packets for determining operating characteristics of network components operating on the Internet 16. The samples may be provided to a monitoring system 26 (e.g., Prometheus), which may be configured as a monitoring server for monitoring the operating characteristics. The operating characteristics may be passed to a real-time visualization system 28 (e.g., Grafana) for providing analytics and visualization services for a user and may include monitoring dashboards regarding the web analytics. Also, the monitoring system 26 may send the detected network characteristics an analytics system 30, which may be configured to analyze certain data transfer parameters. This information can then be passed to the orchestration system 20, which can utilize the real-time information for helping to create the data transfer strategies for various end-to-end DTN transfers. However, according to some embodiments, the communications system 10 may be configured to operate without the sampling system 24, monitoring system 26, real-time visualization system 28, and analytics system 30, particularly if the orchestration system 20 is able to obtain the information it needs to create an optimized data transfer strategy without these other components.

For example, the data source 12 and data sink 14 may represent high-end servers configured to store massive amounts of data. The data source 12 and data sink 14 may be data centers, data libraries, digital scientific research storage facilities, host computer systems, or other facility or enterprise configured to wide area data transfers. The orchestration system 20 may be configured for the data transfer between the data source 12 and the data sink 14 and/or may be configured for data transfer events between any two similar high-end data storage server components in the communications system 10 operating over the Internet 16 or other WAN. To optimize the optimal operational parameters, the orchestration system 20 may be configured to pass configuration settings information to the data source 12 via one tuning agent 32 and pass configuration settings information to the data sink 14 via another tuning agent 34. In some embodiments, the links between the Internet 16 and the data source 12 or data sink 14 may be configured to allow data transmission speeds of hundreds of Gbps (i.e., n×100 Gbps).

The orchestration system 20 may be configured to create data transfer strategies for any two DTNs for end-to-end (or disk-to-disk) data transferring operations. The orchestration system 20 is configured to continually update the data transfer strategies as needed, based on any changes in the operating conditions. The orchestration system 20 provides high-bandwidth transfers (e.g., exabytes, zettabytes), configures the data transfer strategies to be more resilient to network changes and more fault-tolerant to optimize the end-to-end exchange.

Figure 2:
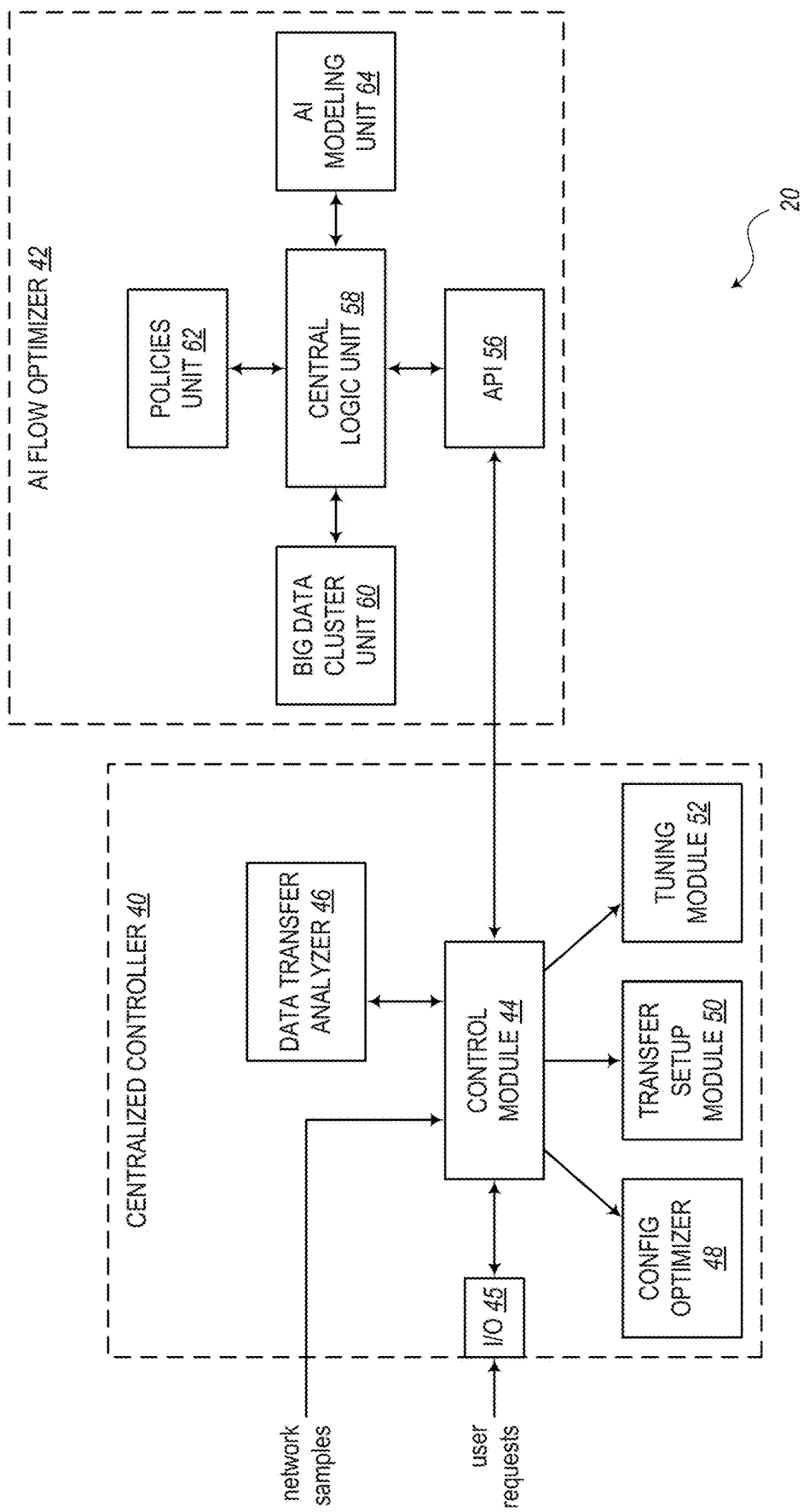
FIG. 2 is a block diagram illustrating an orchestration system for automatically orchestrating massive data transfers, according to various embodiments.

FIG. 2 is a block diagram illustrating an embodiment of the orchestration system 20 shown in FIG. 1 for automatically orchestrating massive data transfers. In this embodiment, the orchestration system 20 includes a centralized controller 40 and an AI flow optimizer 42. The centralized controller 40 may include a control module 44, Input/Output interfaces 45, a data transfer analyzer 46, a configuration optimizer 48, a transfer setup module 40, and a tuning module 52. The AI flow optimizer 42 may include an Application Programming Interface (API) 56, a central logic unit 58, a Big Data cluster unit 60, a policies unit 62, and an AI modeling unit 64.

According to this embodiment, a Big Data transfer framework may include the functional blocks of the centralized controller 40 framework and the AI flow optimizer 42 for assisting in the creation of the data transfer strategy using AI. The centralized controller 40 may act as a mechanism to exchange information between a user (e.g., the I/O interfaces 45), the communications system 10 (or network), network components of the Internet 16, and the AI flow optimizer 42 via the API 56. The AI flow optimizer 42 is configured to optimize the transfer strategy based on information received from the centralized controller 40.

It may be noted that one goal of the present disclosure is to provide an "ideal" Big Data transfer tool that may be capable of the following characteristics:

1. Ability to tune the OS, network components, and storage components of the applicable DTNs (e.g., data source 12 and data sink 14) to an optimal configuration based on capabilities of installed hardware;
2. Implements a data transfer strategy that reduces I/O overhead and directs data transfers to an end process;
3. Uses a data management entity that optimizes file sizes to achieve maximum throughput;
4. Security and identity management systems compatible with existing components used in the industry; and
5. Real-time predictive analytics and system monitoring capabilities that can advise and help fine-tune the data transfer strategy.

Figure 3:
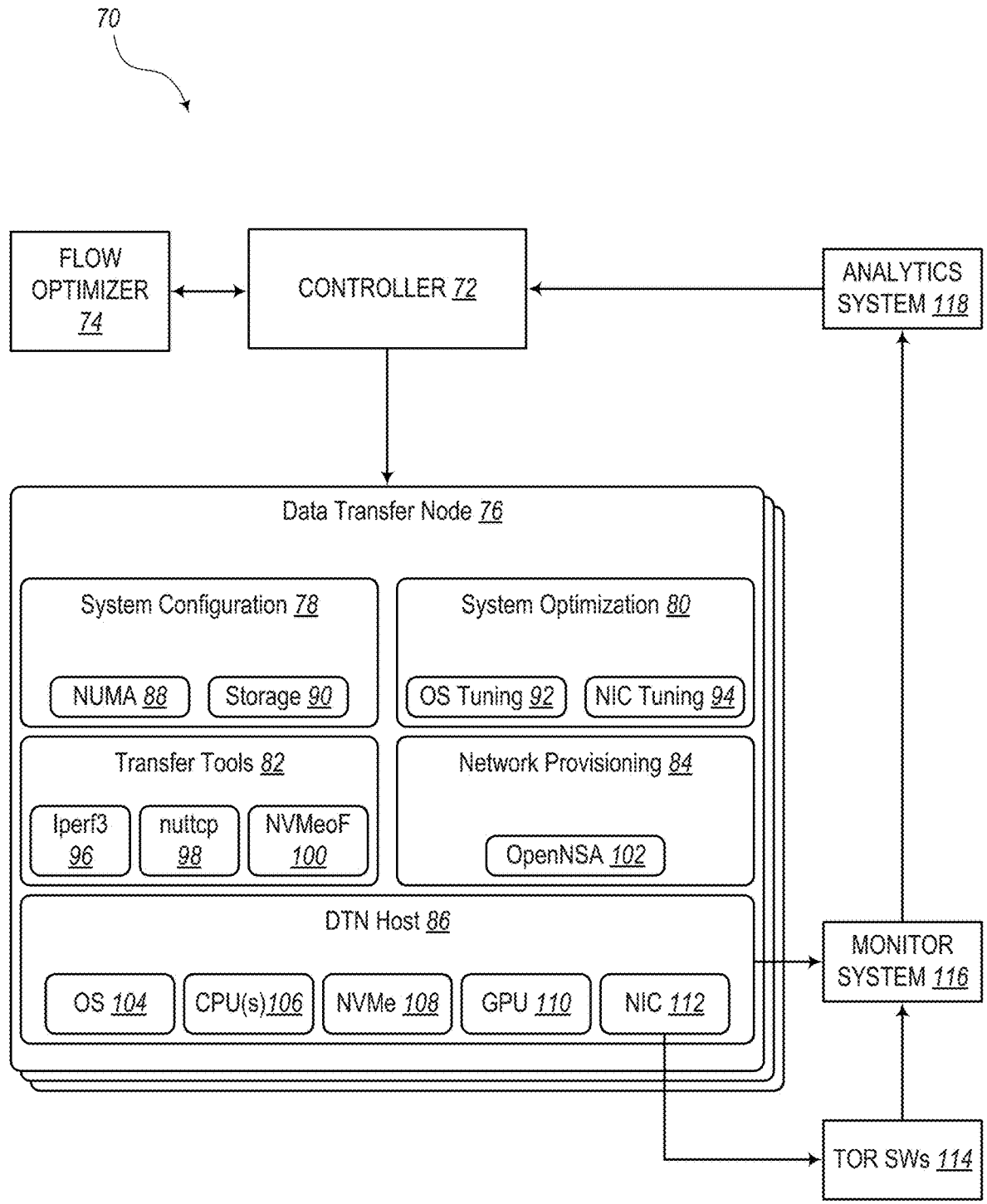
FIG. 3 is a block diagram illustrating a data transfer system for orchestrating multiple DTNs, according to various embodiments.

FIG. 3 is a block diagram illustrating an example embodiment of a data transfer system 70 for orchestrating multiple DTNs for transferring massive amounts of data. In this embodiment, the data transfer system 70 includes a controller 72 (e.g., similar to the centralized controller 40 shown in FIG. 2) and a flow optimizer 74 (e.g., similar to the AI flow optimizer 42 shown in FIG. 2). The data transfer system 70 also includes one or more DTNs 76 (e.g., data source 12, data sink 14, etc.).

Each DTN 76 includes system configurations 78, system optimization parameters 80, transfer tools 82, network provisioning characteristics 84, and DTN host parameters 86. The system configurations 78 may include at least a Non-Uniform Memory Access (NUMA) device 88 and a storage device 90. The system optimization parameters 80 may include at least OS tuning 92 and Network Interface Card (NIC) tuning 94. Also, the one or more transfer tools 82 may include iperf3 96, nuttcp 98, Non-Volatile Memory Express (NVMe) over Fabrics (NVMeoF) 100, and/or others. The network provisioning characteristics 84 may include OpenNSA 102. The DTN host parameters 86 may include configuration settings for an OS 104, CPU(s) 106, NVMe 108, Graphics Processing Unit (GPU) 110, NIC 112, and/or other elements.

The NIC 112 of each DTN 76 may be configured to communicate with Top of Rack (TOR) switches 114 of a sampling server (e.g., similar to sampling system 24). A monitoring system 116 (e.g., similar to the monitoring system 26 shown in FIG. 1) may be used to receive telemetry and configuration information from the DTNs 76 and additional information from the TOR switches 114. The monitoring system 116 may be configured to send monitor information to an analytics system 118 (e.g., similar to the analytics system 30 shown in FIG. 1). The analytics system 118 provide monitoring and analytics information to the controller 72 for processing.

The controller 72 and flow optimizer 74 may work in conjunction with each other to determine optimal operating parameters and configuration settings for the components 78, 80, 82, 84, 86 of each of the applicable DTNs 76 used for transferring large amounts of data from one DTN to another. Also, the controller 72 and flow optimizer 74 can train an ML model to be used for optimizing a data transfer strategy. This ML model can be used to plan the data transfer between two selected DTNs 76 based on initial conditions of the DTNs 76 and any intermediate network components. Then, during the running of the data transfer strategies in place, the controller 72 may receive indications of network changes to one or more components. In response to these changes, the controller 72, with the help of the flow optimizer 74, can re-train the ML model as needed to optimize the current or future data transfer strategies.

The orchestration system 20 (as well as the combination of the controller 72 and flow optimizer 74 of the data transfer system 70) may be configured to improve data transmission performance over high-performance networks in cluster environments, such as in a container-orchestration system (e.g., Kubernetes). The orchestration system 20 may use a software stack to control resources in the DTNs 12, 14, 76 for data movement using container-native services (e.g., using Jupyter notebook) and analysis of data movement through real-time monitoring of the resources. The orchestration system 20 may also be configured to optimize underlying resources (e.g., compute, storage, memory, and network resources) in a container-orchestration system or scalable service deployment. The orchestration system 20 may also be configured to perform research container-native services for DTNs, such as direct access to the low-level hardware (e.g., NUMA) from container-orchestration (e.g., Kubernetes) pods, network stack management (e.g., using NICs), storage management (e.g., using NVMe), transfer protocol optimization (e.g., using NVMeoF), and monitoring of system and networks. The orchestration system 20 may also be configured to enhance additional capabilities for controlling NVMeoF.

According to some embodiments, the control module 44 of the centralized controller 40, controller 72, or other control elements of the various services may include, but not limited to, CILogon and/or Jupyter software platforms for scientific data transfers. These may be able to provide identity and access management processes. For example, CILogon may enable Federated Identity Management (FIM) between multiple clouds, enterprises, domains, etc., and may enable users to uniformly use the same identification data to access the various networks. The FIM system may include a Single Sign-On (SSO) authentication process to allow a user to use a single identifier across multiple systems or organizations. For example, the SSO process may be provided on Jupyter Hub), which may be configured as an interface for the orchestration system 20 or controller 72. Some identity providers may support InCommon, eduGAIN, Google, Github, ORCID, just to name a few. Also, CILogon may allow each user to utilize a unique notebook. The user information can be passed to the orchestration system 20 or other DTN agents, orchestrators, etc. Notebooks may be unique for every user, and the object oriented structure of the controller 72 may allow programmatic access to the DTNs and transfer data.

Figure 4:
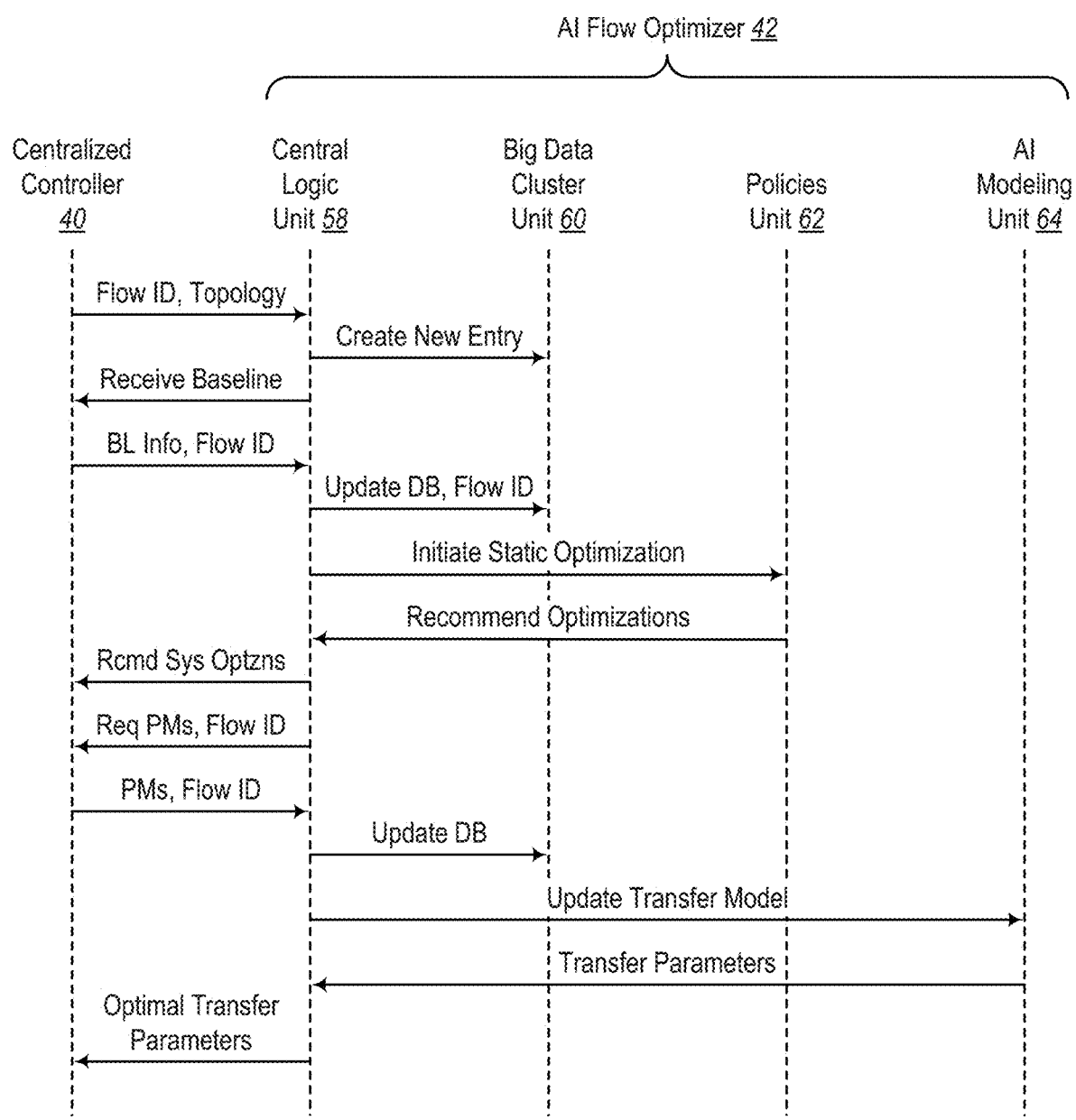
FIG. 4 is a process flow illustrating command exchanges between a centralized controller and an Artificial Intelligence (AI) flow optimizer, according to various embodiments.

FIG. 4 is a process flow illustrating an example of command exchanges between a centralized controller (e.g., centralized controller 40, controller 72, etc.) and AI flow optimizer (e.g., AI flow optimizer 42, 74, etc.). As shown in FIG. 2, the AI flow optimizer 42 may include a central logic unit 58, Big Data cluster unit 60, policies unit 62, and AI modeling unit 64. The centralized controller sends a Flow ID, which represents an identity of a particular data transfer strategy, to the central logic unit 58. The centralized controller also sends topology information of the communications network in which the DTNs are operating. The central logic unit 58 creates a new entry and sends the entry information to the Big Data cluster unit 60, which is configured to stored one or more data transfer strategies. The central logic unit 58 also creates a baseline from the known topology information and sends this back to the centralized controller 40.

Then, the centralized controller 40 sends the baseline information and Flow ID to the central logic unit 58 to request information about the selected data transfer strategy identified by the Flow ID. The central logic unit 58 sends updated database (DB) information and the Flow ID to the Big Data cluster unit 60 and an indication of a request to initiate static optimization to the policies unit 62. In response, the policies unit 62 sends back recommended optimizations based on various policies or network protocols. The central logic unit 58 then sends the recommended systems optimization parameters to the centralized controller 40, which in turn may control the various DTNs, tuning agents (e.g., tuning agents 32, 34), and intermediate components for setting, tuning, resetting, etc. the configuration parameters of the hardware and software components for optimized transfer of the massive amount of data.

The centralized controller 40 then may obtain additional Performance Metrics (PMs) of specific network components and send the PMs along with Flow ID associated with these specific network components to the central logic unit 58. The central logic unit 58 updates the DB of the Big Data cluster Unit 60 to fine-tune the stored data transfer strategies and sends updated transfer information to the AI modeling unit 64 to enable modeling or training of the new AI model or to update or re-train the existing AI models as needed, based on any network changes. The AI modeling unit 64 sends transfer parameters back to the central logic unit 58, which forward the optimal transfer parameters to the centralized controller 40 for enabling the centralized controller 40 to train or re-train the DTNs and intermediate components with initial or updated configuration parameters.

Referring again to FIG. 1, the data source 12 and data sink 14 may be interconnected with the edge devices 19 and/or other core or intermediate components of the Internet 16 to establish 100 Gbps links. For the application layer to receive data at WAN network speeds, some parameters (e.g., such as Transmission Control Protocol (TCP) stack information, storage information, congestion control algorithms, Committed Information Rate (CIR) of switches, Excess Information Rate (EIR) of switches, Peripheral Component Interconnect Express (PCIe) read/write blocks, a number of parallel transfers, block sizes, file sizes, etc.) may be adjusted on a per transfer basis. Each data transfer strategy, identified uniquely by the Flow ID, can have its own set of parameters for optimization between a particular pair of DTNs in the communications system 10.

The orchestration system 20 may have the ability to tune DTNs and orchestrate big data transfers over a variety of transport protocols such as iperf3, nuttcp, Non-Voltage Memory Express (NVMe), NVMe-over-Fabrics (NVMeoF), or the like. In some implementations, NVMeoF may be chosen, for efficiency reasons, as the preferred transport protocol. As mentioned above, the orchestration system 20 may be integrated with CILogon for identity and uniform access management across scientific research and education platforms. Again, the orchestration system 20 may be configured to implement an AI or ML module (e.g., with a regression engine), which can help optimize the various data transfer strategies.

Referring again to FIG. 2, the centralized controller 40 may be expected to accomplish the following functions:
1. Act as the single point of contact (e.g., via the I/O interfaces 45) for the user processes to make requests for initiating "Big Data" transfers.
2. Access source/sink systems (e.g., data source 12 and data sink 14), network elements and in-network computing systems in the domain and use that information to discover the topology of the service path through the Internet 16.
3. Acquiring Performance Metrics (PMs) from the associated egress/ingress ports and other system parts of the data service path.
4. Interact with an AI flow optimizer (e.g., AI flow optimizer 42) via APIs 56 to communicate the topology, PMs information, etc. and receive recommendations from the AI flow optimizer (or AI engine) through these APIs 56 as part of a state machine.
5. Implement information and feedback received from the AI engine to tune the source/sink systems and network elements (e.g., OS information, network information, storage information, etc.) to an optimal configuration, based on capabilities of deployed hardware, and apply other aspects of the data transfer, such as implementing the transfer strategy, data management, security and identity management, etc.
6. Manage data to optimize file sizes using various approaches agnostic to the transfer protocol.
7. Framework that accepts user requests, exchanges information with flow optimizer blocks, extracts parameters, and implements system tunings as recommended by the flow optimizer.
8. Apply use case for application-centric routing where the application is aware of the network capabilities and adjusts traffic topology accordingly.

Referring again to the AI flow optimizer 42 of the orchestration system 20 as shown in FIG. 2, the present disclosure also focuses on novel applications of real-time analytical processes to help modify/optimize systems and transfer protocols to achieve the maximum throughput during the data transfer. The AI flow optimizer 42 uses the centralized controller 40 for exchanging information using the APIs 56. The AI flow optimizer 42 may include the following abilities:
1. Retrieve performance data and system parameters from various egress and ingress points from the transfer path from the centralized controller 40 via the APIs 56. This may include the network elements, computing elements, in-band network telemetry elements, in-network compute elements, etc. It may also perform extracting, transforming, and loading actions, along with sorting, aggregating, extracting, and filtering the data as required.
2. Create a baseline of system capabilities to get an accurate depiction of system capabilities and any potential bottlenecks in the process of data transfer.
3. Recommend pre-transfer optimizations that may be applied to end systems and/or network parameters based on observations made from the points above. These optimizations may be conveyed to the centralized controller 40, which may then implement them on the respective devices.
4. Construct a rich dataset of various performance metrics of the configured service path before the transfer begins and parameters during the transfer.
5. Use the dataset to train an AI-based model that can predict performance of a future transfer and recommend amendments to system configurations, as needed.
6. Communicate the predictions and/or recommendations of changes in configuration data to the centralized controller 40 via the APIs 56, which can then choose a suitable strategy to implement the feedback.
7. The AI-based flow optimizer may be agnostic to which transport technology is used (e.g., NVMeoF, Remote Direct Memory Access (RDMA), etc.), the capabilities of hardware used in service path, and/or the dynamic load the system experience.

The central logic unit 58 may be responsible for maintaining a state machine and control messaging with the centralized controller 40. The state machine may be defined according to FIG. 3 or other similar workflows. The Big Data cluster unit 60 may be responsible for storing and maintaining the data received from the centralized controller 40 related to a specific transfer topology or one or more data transfer strategies. The policies unit 62 may be configured to store static policies and comparative system baseline information. This information may be used to provide one-time system setup optimizations, such as changes in NIC or kernel parameters or allocation of better routes for the transfer. The AI modeling unit 64 may contain pre-trained statistic models which can be fine-tuned and re-trained for parameters extracted specific to a transfer. The AI modeling unit 64 may predict optimum transfer parameters to be used both before the transfer begins and also recommends parameter changes as more PMs are collected.

There may be multiple parameters that the flow optimizer (e.g., AI-assisted optimizer) may recommend. These recommendations may be made both prior to initiating the transfer process and while the transfer process is occurring. Some of the concepts mentioned above may include "Initialization and Baseline" computations, "Host Tuning," "Network Tuning," and "Data Management and Transfer Technology," according to various implementations and defined below:

I. Initialization and Baseline

Network components and systems register with the centralized controller 40, which is configured to analyze hardware, software, etc. of the network components. This step creates an initial inventory of system capabilities and network characteristics. Host characteristics may include OS parameters, kernel parameters, disk I/O parameters, CPU profiles, TCP parameters, CPU load level, CPU temperature, etc., which may be extracted or obtained by performance monitoring, telemetry components, etc., and passed along to the centralized controller 40. Likewise, network characteristics (e.g., latency, jitter, packet loss, link speed, bandwidth-delay product, buffer status, queue status, contending flows, etc.) may be obtained (extracted) to get a fair depiction of system capabilities and any potential hurdles in the process of transferring large amounts of data.

II. Host Tuning

Based on the inventory obtained from step I, the AI flow optimizer 42 can recommend a series of different optimizations to be performed. For example, these may include, but are not limited to, adjustments to the CPU governor, NUMA assignment, Logical Volume Management (LVM) drives, Redundant Array of Independent Disks (RAID) drives, RAID0 drives, NVMe drives, PCIe read/write block sizes, operation frequency increase or turbo-boosting, dividing into parallel processing units or hyper-threading, among many others. It may be noted that current OS may not be file transfer optimized, and thus this step may be useful for getting the parameter values.

III. Network Tuning

Based on network characteristics obtained in the previous steps, tuning processes may be performed on the network stack to allow for optimized data transfer strategies. These may include adjusting the TCP buffer sizes based on the bandwidth-delay product, setting correct TCP congestion algorithm, fair queuing, Maximum Transmission Unit (MTU), packet pacing, etc. Alternate routes, modifying CIR/EIR, allocating more data plane switching resources, and other actions may also be recommended.

IV. Data Management and Transfer Technology

The AI or ML techniques of the AI flow optimizer 42 may be configured to handle multiple data transfer mechanisms, such as nuttcp, NVMeoF. or other User Datagram Protocol (UDP)-based processes. The systems and methods of the present disclosure may also be capable of optimizing file batch sizes, transfer sequences, and transfer parameters to reduce overall I/O overhead as part of its data management feature.

According to additional embodiments, the AI flow optimizer 42 may further be configured to provide:

1. Automated AI-assisted optimization of hardware and software parameters of network system parts of the provisioned service path to achieve the maximum data transfer capacity per transfer, particularly since no OS is configured to do that for high-speed data transfers with NIC of 100 Gbps and above.
2. AI-assisted flow optimization that extracts various parameters from systems along the service path and establishes baselines for the system capacity for data transfers between pairs of DTNs. By analytical means, the flow optimizer can advise if the systems can be tuned for a better performance.
3. AI-assisted flow optimization that can extract performance metrics from various ingress and egress paths of the service path and adjudicates real-time modifications to transfer protocol parameters based on AI, ML, regression analysis, statistical algorithms, etc. This method will also be agnostic to any transfer protocols used and may suitably adjust its strategy to the protocol that is used.
4. AI engine that continuously updates its dataset based on performance metrics extracted before and during the Big Data transfer for future transfers.
5. Communicate and transact with external orchestrator or controller frameworks (e.g., centralized controller 40) to exchange information, data, recommended actions, remediations, etc.

The state machine and signal chronology described with respect to FIG. 4 may be configured according to the steps below:

1. User process interacts with the controller to request provisioning of service over an identified sink system.
2. Controller discovers inventory and assigns a service path for the service. The path may traverse network elements, compute resources and other accelerating agents. A flow ID is assigned to the service.
3. Flow ID and service topology specifics are passed onto the Flow Optimizer (FO) block, which creates a suitable Database entry.
4. The FO block requests for system inventory from systems in service path to determine baseline and system capabilities for the efficiency of the transfer.
5. Once system characteristics are delivered, the FO block passes that information onto the static rule agent, which then determines and one-time optimizations that need to be performed on the service path systems. These optimizations are communicated to the controller through the API block and implemented by the controller.
6. Next, the FO block requests period update of PMs from the controller. These PMs are parsed, cleaned, and loaded to the Database entry and is used to construct a dataset of available PMs on the service path.
7. The source node communicates to the controller the specifics of the data to be transferred, transport protocol to be used and an initial set of hyperparameters to be used by the protocol. This is noted by the FO block as well.
8. Upon receiving suitable entries, the AI Model in FO creates a regression model for estimating performance and optimal transfer parameters of the protocol to be used. This is done by learning from previous such transfers and mapping against throughput achieved.

9. Transfer begins.
10. Transfer is analyzed, and the dataset updated with current parameters.
11. If transient system and load conditions change during the transfer, new optimal transfer parameters are provided. Transfer can also be paused or slowed down at the source to efficiently deal with traffic congestions
12. Transfer ends.

The AI or ML techniques of the present disclosure may be configured to estimate a system baseline and perform an initial check of system capabilities as mentioned above. The flow optimizer 42, 74 may request the following non-exhaustive list of source, sink. and network system parameters from the controller using its APIs:

1. Host characteristics pertaining to OS/kernel parameters, disk I/O, CPU profiles, TCP parameters, CPU load level, CPU temperature etc. are extracted.
2. Likewise, network characteristics such as latency, jitter, packet losses and link speed between nodes.
3. Other network related parameters, if available, such as bandwidth-delay product, buffer and queue status, contending flows, CIR/EIR and packet MTU size.

Based on this information, the flow optimizer 42, 74 may check static rules and reference equations populated in the policies unit 62 from common traffic engineering and computer architecture practices. The flow optimizer 42, 74 may then recommend changes to any such parameters prior to initiating the transfer so that the systems are tuned to optimum settings. For example, this may include, but is not limited to, altering NUMA/RAID assignments, enabling turbo-boosting and hyper-threading, setting the correct TCP buffer size based on bandwidth delay product, changing to the latest TCP congestion control algorithm, PCIe read/write block sizes, etc.

An analytics engine (orchestration system 20, analytics system 30, 118, etc. may include the following approach:

1. Extract DTN and network characteristics both before the transfer begins and during the data transfer.
2. Store extracted data in separate datasets to be later used by a regression engine.
3. Obtain a system snapshot before beginning a new transfer.
4. Utilize an ML engine that processes these pre-transfer conditions along with user-provided file parameters and workers processes to predict the expected throughput, based on past datasets.
5. Allow a user to modify a transfer strategy (e.g., based on a number of worker processes, block size, file size, etc.) based on this feedback.

Figure 5:
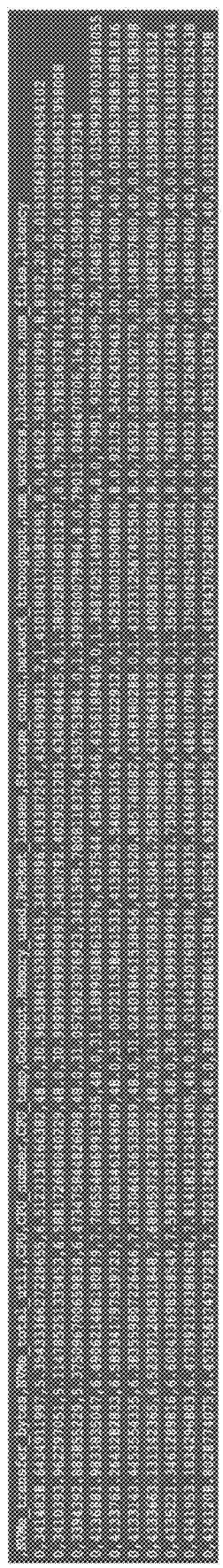
FIG. 5 is a diagram illustrating an example of a dataset of prior transfer parameters of a DTN system used to train an AI model, according to various embodiments.

FIG. 5 is a diagram illustrating an example of a dataset 120 of prior transfer parameters of a DTN system (e.g., communications system 10, data transfer system 70, etc.) used to train an AI model. The dataset 120 may be used to train and test a simple regression-based ML model. The dataset 120 may be extracted from one or more prior data transfers.

The model may predict the network throughput for future transfers for a given set of parameters. The flow optimizer 42, 74 may initially be deployed in a greenfield with the pre-trained model using this standard dataset 120 constructed from transfers originating from diverse sources to include varied system conditions. The ML model may gradually tune to parameters pertaining to the systems connected as subsequent transfers occur.

Once PMs pertaining to the deployed system start populating the database, the source node provides information on the file size, number of files, transport protocol to be used, number of processes, blocksize, etc. The model can predict the expected throughput with these settings provided. However, the parameters of the dataset 120 may not be optimal in some cases. The model can therefore sweep across various possible values of the various transfer parameters (e.g., the number of processes, the number of files to be used per process, the blocksize to be used, etc.) and select the optimal values for them which may maximize the throughput. This can be achieved by using simpler heuristic-based approaches, such as gradient-descent optimization for local throughput maxima.

These optimal transfer parameters (e.g., processes, number of files, blocksize, etc.) are then communicated to the source using the controller. Once these are implemented and transfer begins, the dataset 120 can be updated with the latest PMs. Batch learning may be performed in some implementations with a pre-determined batch size to update the ML regression model. This may help the model to better tune to the systems under control.

It should also be noted that the static policy block may also have access to PMs being retrieved. As transient conditions change, it may be requested that some system parameters be updated by the policies unit 62 to better adapt to changing conditions. This may trigger subsequent changes to transfer parameters by the flow optimizer 42, 74. The embodiments of control messaging exchanges may be configured to overcome many of the drawbacks of the conventional systems by fully automating the tuning, monitoring, real-time optimization, and auto-scaling of a variety of flows.

Figure 6:
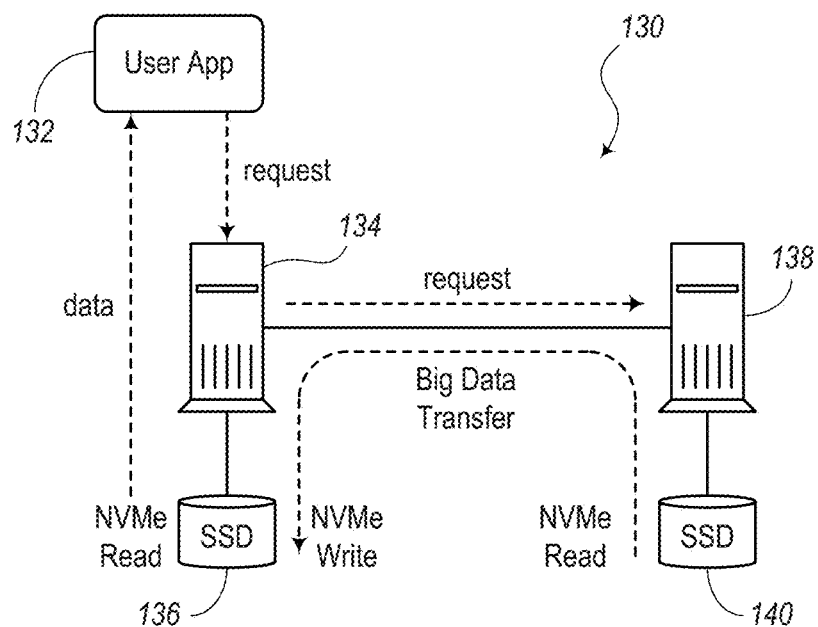
FIG. 6 is a schematic diagram illustrating a conventional request arrangement for initiating a big data transfer.

FIG. 6 is a schematic diagram illustrating a conventional data transfer system 130 having a conventional request arrangement for initiating a Big Data transfer. In this example, the data transfer system 130 includes a user application 132, a first DTN 134 with a first Solid State Device (SSD) database 136, and a second DTN 138 with a second SSD database 140. The user application 132 provides a user request to the first DTN 134, which may then transmit the request to the second DTN 138. The second DTN 138 is configured to retrieve data for transfer by initiating a NVMe read action from the second SSD database 140, pass this information to the first DTN 134, which stores the data in the first SSD database 136 in a NVMe write action. Then, in another NVMe read action, the first DTN 134 transmits the data from the first SSD database 136 to the user application 132.

Figure 7:
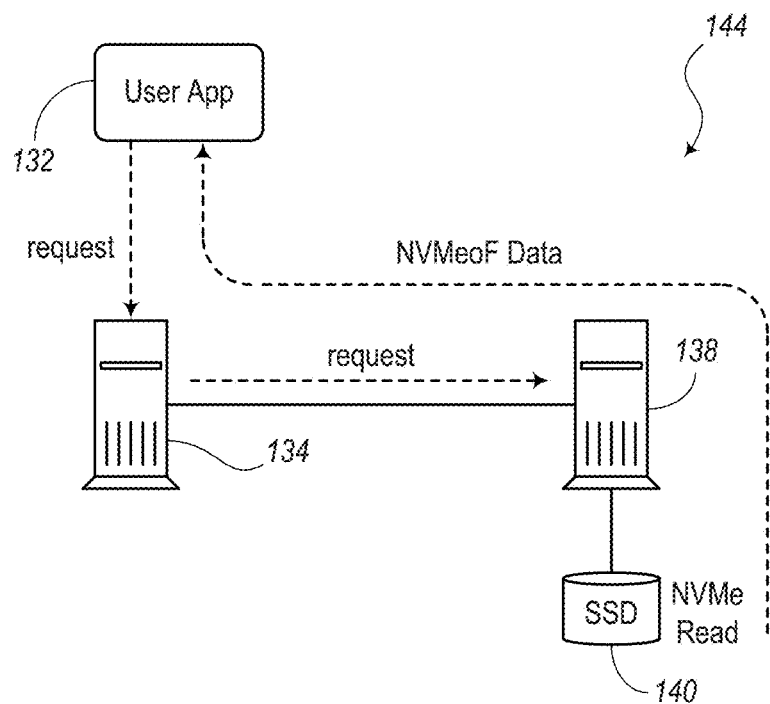
FIG. 7 is a schematic diagram illustrating an improved request arrangement for initiating a big data transfer, according to various embodiments.

FIG. 7 is a schematic diagram illustrating an embodiments of a data transfer system 144 that represents an improved request arrangement, as compared with the conventional arrangement of FIG. 6, for initiating a Big Data transfer. In this implementations, the first SSD databased 136 is not used, thereby simplifying the data transfer. The user application 132 provides a user request to the first DTN 134, which again passed the request to the second DTN 138. The second DTN 138 is configured to perform a single NVMe read action of the second SSD database 140 and pass the NVMeoF data to the first DTN 134, which forwards the data on to the user application 132.

Figures 8, 9:
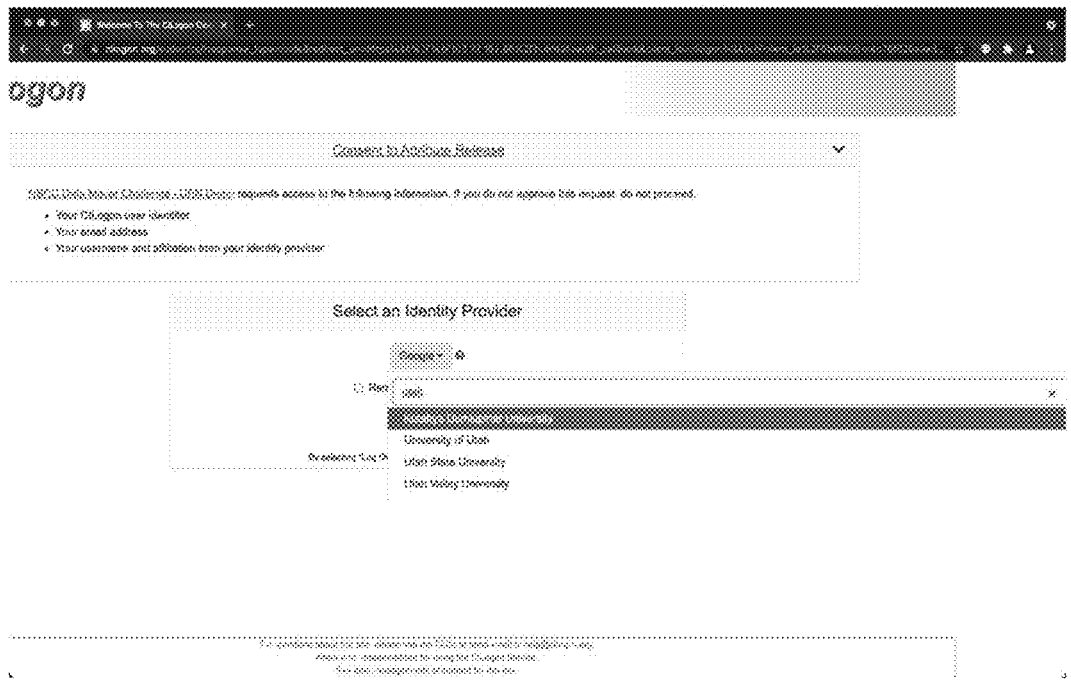
FIG. 8 is a screenshot of a User Interface (UI) illustrating an example of a control program of a DTN system for identifying source providers, according to various embodiments.
FIG. 9 is a screenshot of a UI illustrating an example of user information code using a control program of a DTN system, according to various embodiments.
Figure 10:
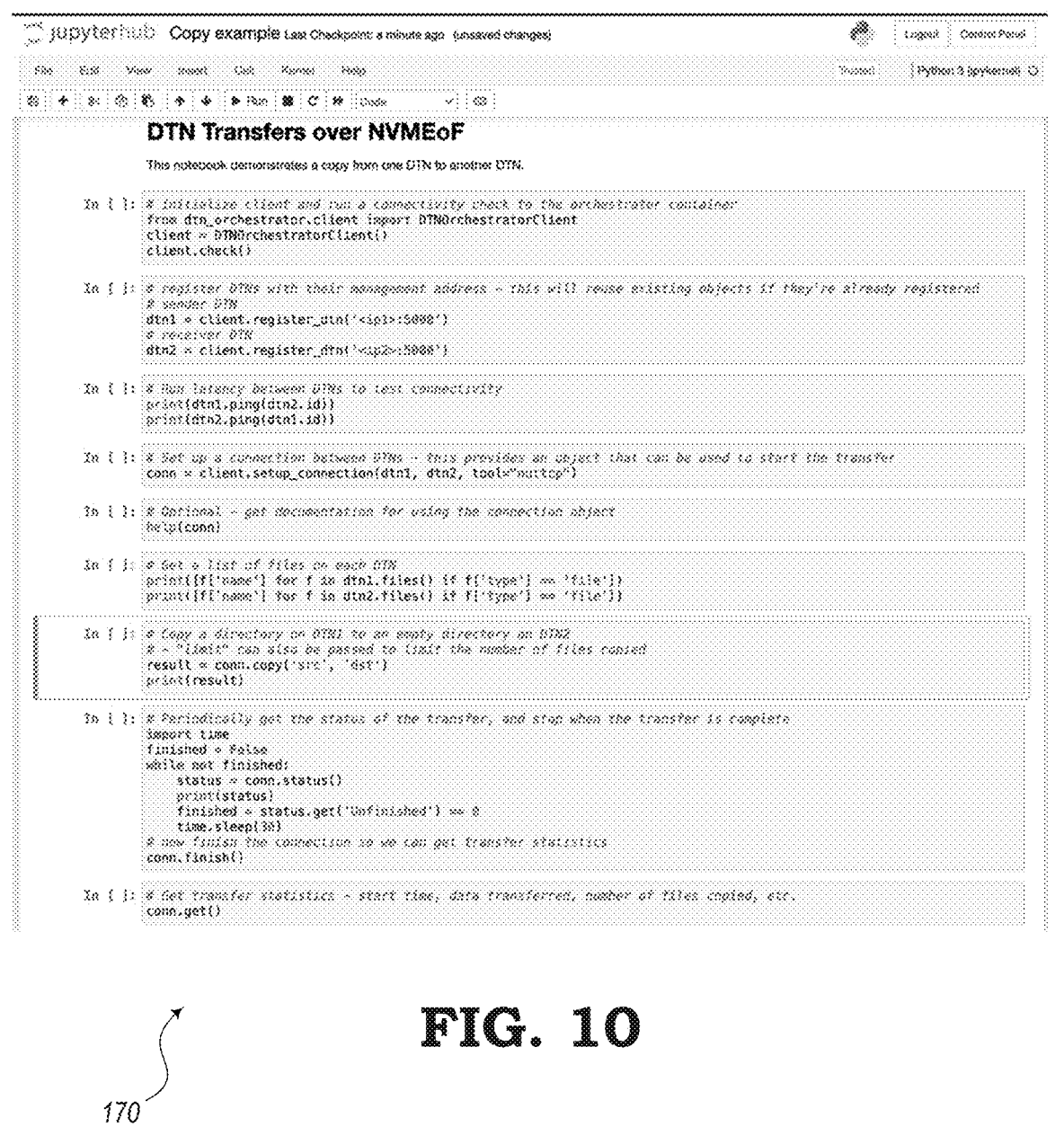

FIG. 8 is a screenshot 150 of a User Interface (UI) and shows an example of a control program of a DTN system for identifying source providers. FIG. 9 is a screenshot 160 of a UI and shows an example of user information code using a control program of a DTN system. FIG. 10 is a screenshot 170 of a UI and shows an example of object oriented code of a control program of a DTN system.

Figures 11, 12:
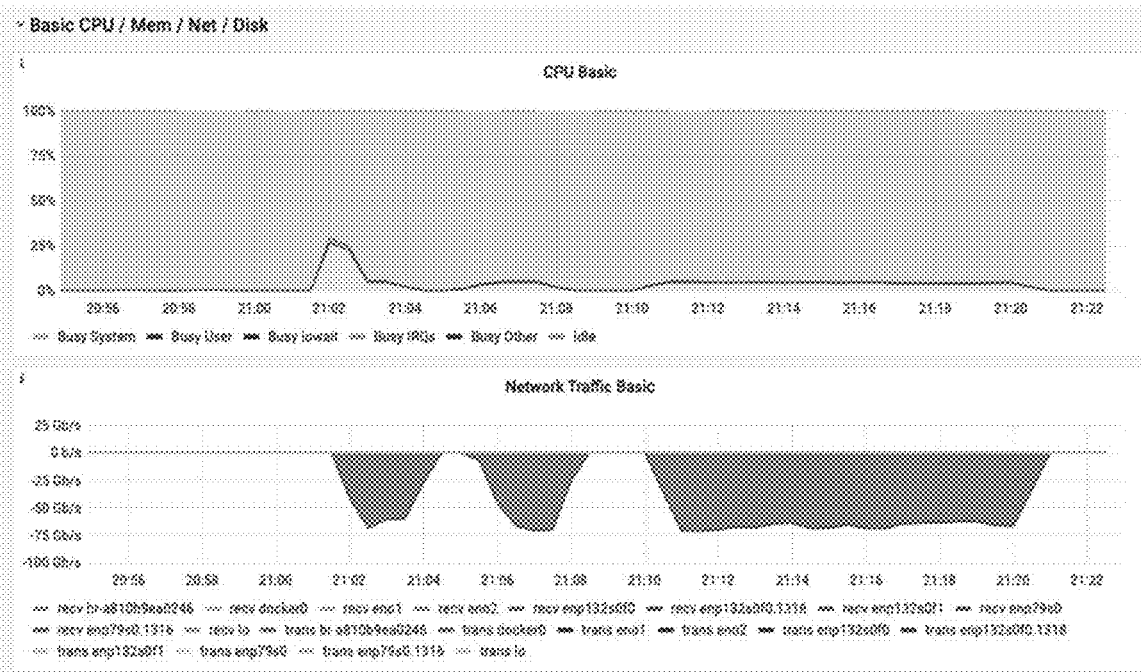
FIG. 11 is a graph illustrating CPU and network traffic information during a visualization example associated with a DTN transfer procedure, according to various embodiments.
FIG. 12 is a table illustrating results of a system implementation with respect to the systems and methods of the present disclosure.
Figures 13A, 13B, 13C, 13D:
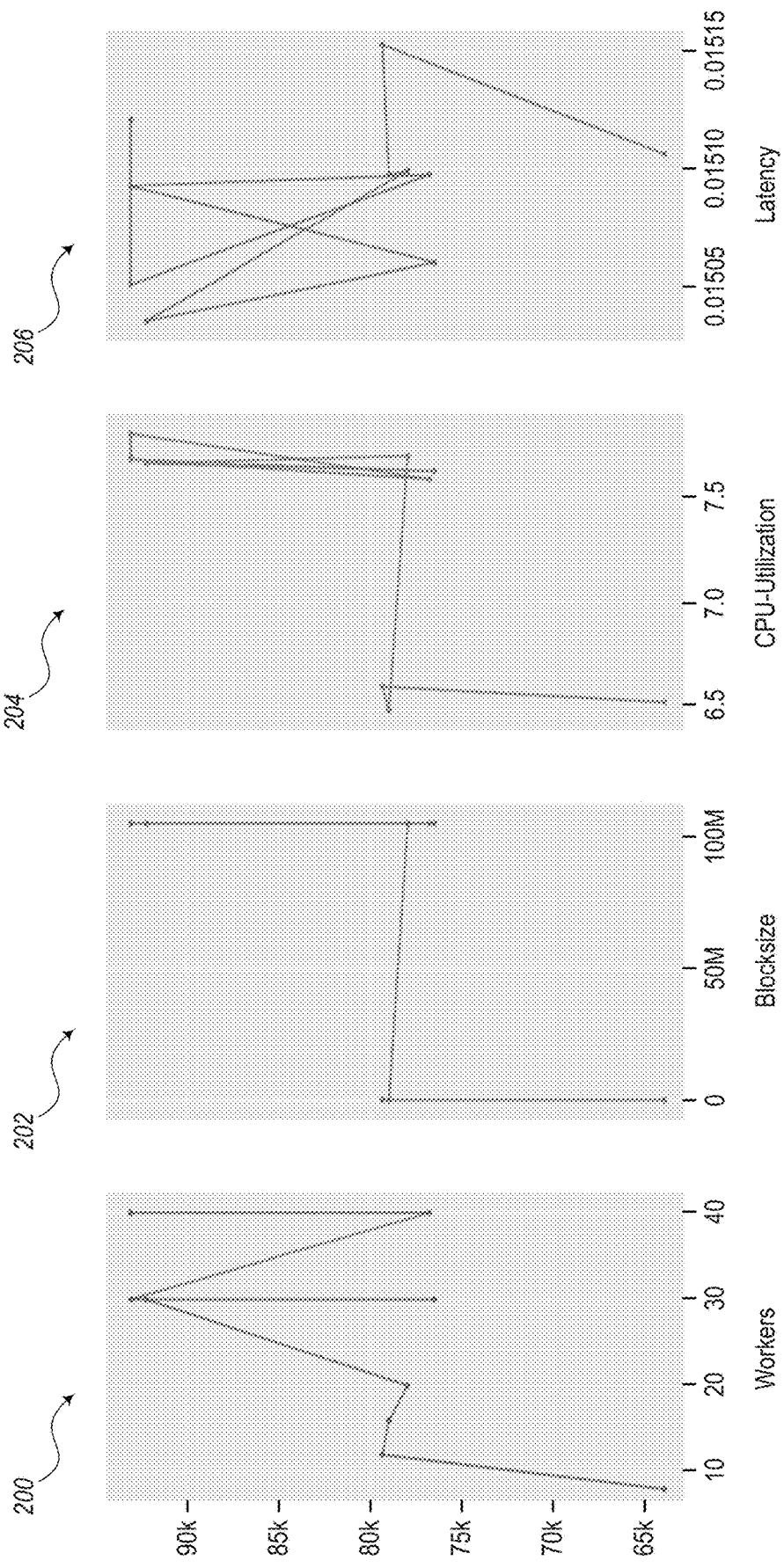
FIGS. 13A-13D are a set of graphs illustrating results of data transfer optimization techniques provided by the system implementation.

FIG. 11 is a graph illustrating CPU and network traffic information during a visualization example associated with a DTN transfer procedure. For example, the visualization may be part of the real-time visualization system 28 shown in FIG. 1 and/or may be part of the orchestration system 20 itself for showing network parameters to a network operator or other users.

FIG. 12 is a table 190 illustrating results of an example system implementation (proof of concept) with respect to the systems and methods of the present disclosure. The nodes in the table are from geographically diverse locations as part of the implementation. FIGS. 13A-13D are a set of graphs 200, 202, 204, 206, respectively, illustrating results of data transfer optimization techniques provided by the system implementation.

Figure 14:
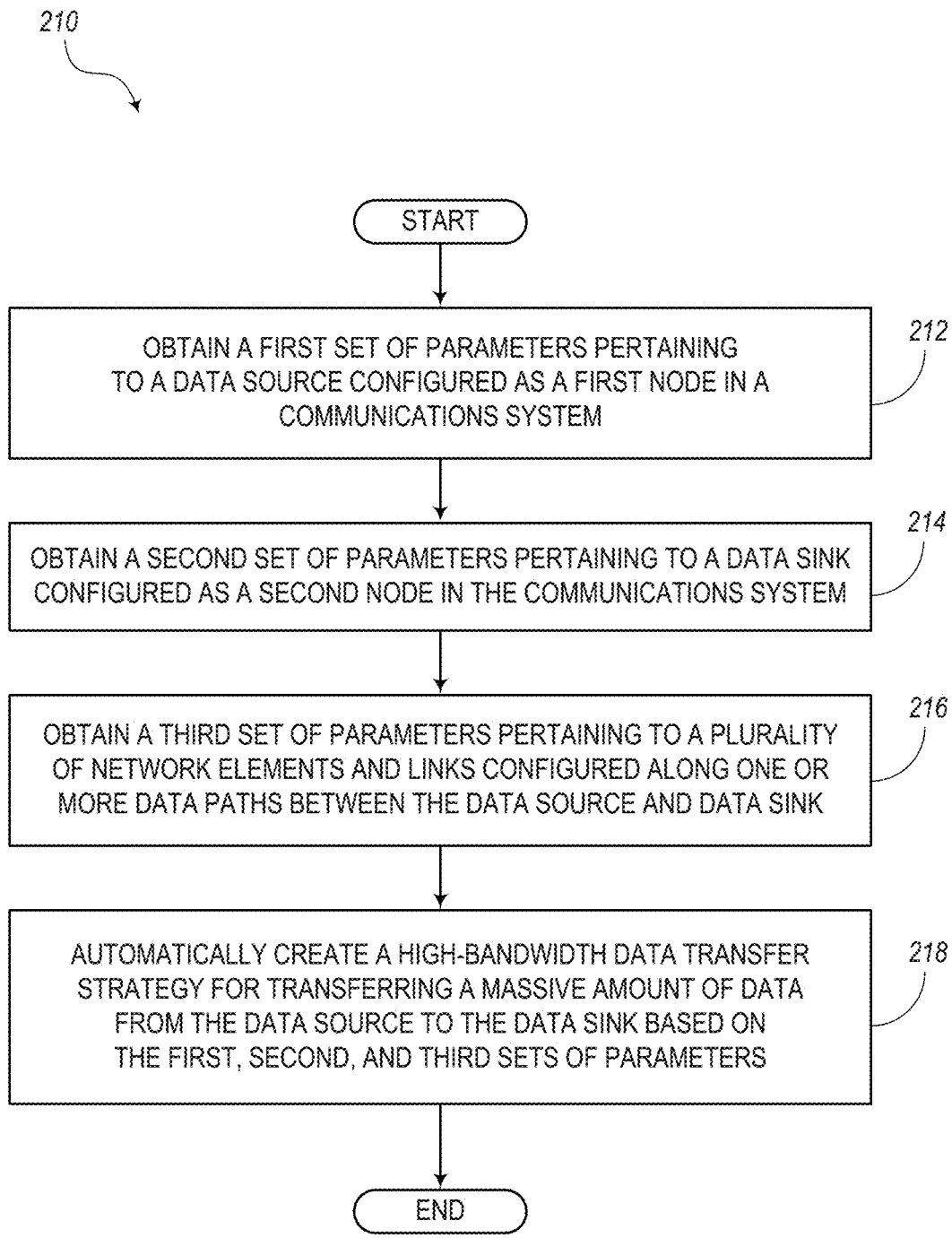
FIG. 14 is a flow diagram illustrating a process for transferring a massive amount of data from one node to another, according to various embodiments.

FIG. 14 is a flow diagram illustrating an embodiment of a process 210 for transferring a massive amount of data from one node to another. As illustrated, the process 210 includes a step of obtaining a first set of parameters pertaining to a data source configured as a first node in a communications system, as indicated in block 212. The process 210 also includes the step of obtaining a second set of parameters pertaining to a data sink configured as a second node in the communications system, as indicated in block 214. Also, the process 210 includes obtaining a third set of parameters pertaining to a plurality of network elements and links configured along one or more data paths between the data source and data sink, as indicated in block 216. Furthermore, the process 210 includes the step of automatically creating a high-bandwidth data transfer strategy for transferring a massive amount of data from the data source to the data sink based on the first, second, and third sets of parameters, as indicated in block 218.

In some embodiments, the process 210 may be performed by the orchestration system 20 shown in FIGS. 1 and 2 or the controller 72 and flow optimizer 74 shown in FIG. 3. The high-bandwidth data transfer strategy, as described above, may include a procedure of configuring multiple hardware and software settings of the data source, data sink, and applicable network elements and links selected from the plurality of network elements and links. The applicable network elements and links, for example, may include at least in-band network telemetry components and storage devices. The storage devices may include one or more of Non-Volatile Memory Express (NVMe), NVMe-over-Fabrics (NVMeoF), and Remote Direct Memory Access (RDMA). The high-bandwidth data transfer strategy may be an initial data transfer strategy based on an initial state of the data source, data sink, and plurality of network elements and links. In some implementations, the process 210 may further include the step of obtaining real-time parameters during a current data transfer to tune or adjust the multiple hardware and software settings and to perform an auto-scale process based on the size of the communications system.

Also, the tuning or adjusting of the multiple hardware and software settings of the data source and data sink may include a) adjusting a CPU governor setting, b) creating assignments for Non-Uniform Memory Access (NUMA) or a Redundant Array of Independent Disks (RAID), c) controlling Logical Volume Management (LVM) aspects of RAID0 or Non-Volatile Memory Express (NVMe) drives, d) adjusting Peripheral Component Interconnect Express (PCIe) read/write block sizes, e) increasing the operating frequency of a Central Processing Unit (CPU), f) dividing a processing core into multiple units for parallel computation, g) adjusting Transmission Control Protocol (TCP) buffer size based on a bandwidth-delay product, h) adjusting a TCP congestion control algorithm, i) tuning an Operating System (OS) for file transfer, and/or other actions. The action of tuning or adjusting the multiple hardware and software settings of the plurality of network elements and links may include a) tuning network stack settings, b) adjusting Transmission Control Protocol (TCP) buffer sizes based on a bandwidth-delay product, c) adjusting a TCP congestion control algorithm, d) utilizing a fair queueing algorithm, e) utilizing the Maximum Transmission Unit (MTU), f) utilizing packet pacing, g) utilizing alternate routes, h) modifying the Committed Information Rate (CIR), i) modifying the Excess Information Rate (EIR), j) allocating additional data-plane switching resources, k) adjusting Non-Volatile Memory Express over Fiber (NVMeoF) parameters, l) adjusting iperf3 parameters, m) adjusting nuttcp parameters, n) adjusting User Datagram Protocol (UDP) parameters, o) optimizing file batch sizes, p) adjusting transfer sequency parameters, q) adjusting file sizes, and/or other actions.

The orchestration system, according to some embodiments, may include a centralized controller and an Artificial Intelligence (AI)-assisted flow optimizer. The centralized controller, in some cases, may be associated with the processing device, and the AI-assisted flow optimizer may be configured to create an AI model that utilizes the high-bandwidth data transfer strategy described above. In some embodiments, the centralized controller may be configured to extract Performance Metrics (PMs) from ingress ports and egress ports of the data source and data sink and may further be configured to adjudicate real-time modifications of the high-bandwidth data transfer strategy based on AI re-training techniques. The centralized controller may also be configured to fine-tune the data source and data sink by re-training configuration settings of the high-bandwidth data transfer strategy for maximum throughput. Also, the centralized controller may further be configured to implement the re-trained high-bandwidth data transfer strategy for current and future data transfer operations.

In some embodiments, the data source may include one or more high-end servers of a first data center and the data sink may include one or more high-end servers of a second data center. The high-bandwidth data transfer strategy may include transferring the massive amount of data at a speed of hundreds of Gbps from the data source to the data sink. The process 210 may further be defined whereby the high-bandwidth data transfer strategy can perform a step of increasing a data transfer speed beyond a speed typically provided by an operating system associated with one or both of the data source and data sink. The process 210 may further include tuning or adjusting configuration settings of the high-bandwidth data transfer strategy, where the configuration settings may include a) Transmission Control Protocol (TCP) stack settings, b) storage settings, c) congestion control settings, d) Committed Information Rate (CIR) settings, e) Excess Information Rate (EIR) settings, f) Peripheral Component Interface Express (PCIe) settings, g) a number of parallel data paths, h) a block size, i) a file size, and/or other settings.

The first, second, and third sets of parameters (blocks 212, 214, 216) may represent baseline information defining the capabilities and potential hurdles of the communications system. The process 210 may further include using the baseline information to register an inventory and topology of the communications system. The first and second sets of parameters, for example, may include a) Operating System (OS) parameters, b) kernel parameters, c) disk Input/Output (I/O) parameters, d) Central Processing Unit (CPU) profile parameters, e) CPU load level parameters, f) CPU temperature parameters, g) Transmission Control Protocol (TCP) parameters, and/or other parameters. The third set of parameters, for example, may include a) latency parameters, b) jitter parameters, c) packet loss parameters, d) link transmission speeds between network elements, e) bandwidth-delay product, f) buffer and queue status parameters, g) contending flows, h) Committed Information Rate (CIR) parameters of network elements, i) Excess Information Rate (EIR) parameters of network elements, j) Maximum Transmission Unit (MTU) size parameters of packets, and/or other parameters. Each of the data source and data sink may include a Network Interface Card (NIC) for implementing the high-bandwidth data transfer strategy to enable transfer of data on the order of zettabytes.

Assuming that all nodes are equally tuned, the data transfer processes described in the present disclosure may be sensitive to various network parameters, such as a) latency between nodes, b) I/O waits and CPU utilization, c) file size used, especially in case of lots of small files, d) the number of processes used for data transfers, e) the blocksize used between files, among others. One choice (e.g., an optimal choice) of these parameters may result in attaining predictably higher throughput. Also, by using ML models, the systems and methods of the present disclosure can be used to estimate or ballpark these parameters, based on existing system conditions.

In some embodiments, the flow optimizer 42, 74 may be deployed in a pre-trained "default" mode in a green field setting. As users initiate future transfers, the model parameters may be updated to better represent the topology under observation. The dataset used to train the flow optimizer to a default model may be constructed using data extracted from other such transfers.

Also, the systems and methods of the present disclosure are configured to adapt to changing environmental needs to be a critical part of the AI-centric approach. Hence, once the model is deployed and transfers occur, the controller 40, 72 may keep updating the transfer parameters to reach optimal configuration for future transfers. Real-time adaptations for current transfers may be achieved by reward-based approaches, such as Reinforcement Learning.

Furthermore, the AI techniques may utilize heuristics, ML, optimization algorithms, etc. Regarding heuristic approaches, most algorithms in these families now come under the umbrella of the AI environment. However, there may be differences in the approaches. For example, in a case where the parameters are always known, the topology would be stable and an optimization objective may be constant (e.g., to maximize throughput) and a multi-parameter optimization technique may perform faster. However, faster may not mean efficient, especially in dynamic conditions. Optimization based approaches may result in underfitting or overfitting and does not guarantee that future transfers are correctly predicted. ML based approaches may perform better to generalize on future unseen data.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An orchestration system comprising:
a processing device,
a memory device configured to store a computer program having instructions that, when executed, enable the processing device to
obtain a first set of parameters pertaining to a data source configured as a first node in a communications system from the data source,
obtain a second set of parameters pertaining to a data sink configured as a second node in the communications system from the data sink,
obtain a third set of parameters pertaining to a plurality of network elements and links configured along one or more data paths between the data source and the data sink from an edge device disposed between the data source and the data sink,
automatically create a high-bandwidth data transfer strategy for transferring a massive amount of data from the data source to the data sink based on the first, second, and third sets of parameters, the high-bandwidth data transfer strategy including adjusting or tuning multiple hardware and software settings of one or more of the data source, the data sink, and applicable network elements and links selected from the plurality of network elements and links, and a centralized controller and an Artificial Intelligence (AI)-assisted flow optimizer, wherein the centralized controller is associated with the processing device, and wherein the AI-assisted flow optimizer is configured to create an AI model that utilizes the high-bandwidth data transfer strategy.

2. The orchestration system of claim 1, wherein the applicable network elements and links include at least in-band network telemetry components and storage devices, and wherein the storage devices include one or more of Non-Volatile Memory Express (NVMe), NVMe-over-Fabrics (NVMeoF), and Remote Direct Memory Access (RDMA).

3. The orchestration system of claim 1, wherein the high-bandwidth data transfer strategy is an initial data transfer strategy based on an initial state of the data source, the data sink, and the plurality of network elements and links, and wherein the instructions further enable the processing device to obtain real-time parameters during a current data transfer to further tune or adjust the multiple hardware and software settings and to perform an auto-scale process based on the size of the communications system.

4. The orchestration system of claim 3, wherein further tuning or adjusting the multiple hardware and software settings of one or more of the data source and the data sink includes one or more of adjusting a CPU governor setting, creating assignments for Non-Uniform Memory Access (NUMA) or a Redundant Array of Independent Disks (RAID), controlling Logical Volume Management (LVM) aspects of RAID0 or Non-Volatile Memory Express (NVMe) drives, adjusting Peripheral Component Interconnect Express (PCIe) read/write block sizes, increasing the operating frequency of a Central Processing Unit (CPU), dividing a processing core into multiple units for parallel computation, adjusting Transmission Control Protocol (TCP) buffer size based on a bandwidth-delay product, adjusting a TCP congestion control algorithm, and tuning an Operating System (OS) for file transfer.

5. The orchestration system of claim 3, wherein further tuning or adjusting the multiple hardware and software settings of the plurality of network elements and links includes one or more of tuning network stack settings, adjusting Transmission Control Protocol (TCP) buffer sizes based on a bandwidth-delay product, adjusting a TCP congestion control algorithm, utilizing a fair queueing algorithm, utilizing the Maximum Transmission Unit (MTU), utilizing packet pacing, modifying the Committed Information Rate (CIR), modifying the Excess Information Rate (EIR), allocating additional data-plane switching resources, adjusting Non-Volatile Memory Express over Fiber (NVMeoF) parameters, adjusting iperf3 parameters, adjusting nuttcp parameters, adjusting User Datagram Protocol (UDP) parameters, optimizing file batch sizes, adjusting transfer sequency parameters, and adjusting file sizes.

6. The orchestration system of claim 1, wherein the centralized controller is configured to extract Performance Metrics (PMs) from ingress ports and egress ports of the data source and the data sink and is further configured to adjudicate real-time modifications of the high-bandwidth data transfer strategy based on AI re-training techniques.

7. The orchestration system of claim 1, wherein the centralized controller is configured to fine-tune the data source and the data sink by re-training the multiple hardware and software settings of the high-bandwidth data transfer strategy for maximum throughput, and wherein the centralized controller is further configured to implement the re-trained high-bandwidth data transfer strategy for current and future data transfer operations.

8. The orchestration system of claim 1, wherein the data source includes one or more high-end servers of a first data center and the data sink includes one or more high-end servers of a second data center, and wherein the high-bandwidth data transfer strategy includes transferring the massive amount of data at a speed of hundreds of Gbps from the data source to the data sink.

9. The orchestration system of claim 1, wherein the high-bandwidth data transfer strategy includes increasing a data transfer speed beyond a speed typically provided by an operating system associated with one or both of the data source and the data sink.

10. The orchestration system of claim 1, wherein the multiple hardware and software settings include one or more of Transmission Control Protocol (TCP) stack settings, storage settings, congestion control settings, Committed Information Rate (CIR) settings, Excess Information Rate (EIR) settings, Peripheral Component Interface Express (PCIe) settings, a number of parallel data paths, a block size, and a file size.

11. The orchestration system of claim 1, wherein the first, second, and third sets of parameters represent baseline information defining the capabilities and potential hurdles of the communications system, and wherein the instructions further enable the processing device to use the baseline information to register an inventory and topology of the communications system.

12. The orchestration system of claim 1, wherein the first and second sets of parameters include Operating System (OS) parameters, kernel parameters, disk Input/Output (I/O) parameters, Central Processing Unit (CPU) profile parameters, CPU load level parameters, CPU temperature parameters, and Transmission Control Protocol (TCP) parameters.

13. The orchestration system of claim 1, wherein the third set of parameters includes one or more of latency parameters, jitter parameters, packet loss parameters, link transmission speeds between network elements, bandwidth-delay product, buffer and queue status parameters, contending flows, Committed Information Rate (CIR) parameters of network elements, Excess Information Rate (EIR) parameters of network elements, and Maximum Transmission Unit (MTU) size parameters of packets.

14. The orchestration system of claim 1, wherein each of the data source and the data sink includes a Network Interface Card (NIC) for implementing the high-bandwidth data transfer strategy.

15. A non-transitory computer-readable medium configured to store computer logic having instructions that, when executed, cause one or more processing devices to:
obtain a first set of parameters pertaining to a data source configured as a first node in a communications system from the data source,
obtain a second set of parameters pertaining to a data sink configured as a second node in the communications system from the data sink,
obtain a third set of parameters pertaining to a plurality of network elements and links configured along one or more data paths between the data source and the data sink from an edge device disposed between the data source and the data sink, automatically create a high-bandwidth data transfer strategy for transferring a massive amount of data from the data source to the data sink based on the first, second, and third sets of parameters, the high-bandwidth data transfer strategy including adjusting or tuning multiple hardware and software settings of one or more of the data source, the data sink, and applicable network elements and links selected from the plurality of network elements and links, and create an Artificial Intelligence (AI) model that utilizes the high-bandwidth data transfer strategy using a centralized controller and an AI-assisted flow optimizer, wherein the centralized controller is associated with one or more processing devices.

16. The non-transitory computer-readable medium of claim 15, wherein the massive amount of data includes data on the order of zettabytes.

17. A method comprising the steps of:
obtaining a first set of parameters pertaining to a data source configured as a first node in a communications system from the data source;
obtaining a second set of parameters pertaining to a data sink configured as a second node in the communications system from the data sink;
obtaining a third set of parameters pertaining to a plurality of network elements and links configured along one or more data paths between the data source and the data sink from an edge device disposed between the data source and the data sink;
automatically creating a high-bandwidth data transfer strategy for transferring a massive amount of data from the data source to the data sink based on the first, second, and third sets of parameters, the high-bandwidth data transfer strategy including adjusting or tuning multiple hardware and software settings of one or more of the data source, the data sink, and applicable network elements and links selected from the plurality of network elements and links, and
creating an Artificial Intelligence (AI) model that utilizes the high-bandwidth data transfer strategy using a centralized controller and an AI-assisted flow optimizer, wherein the centralized controller is associated with one or more processing devices carrying out the method.

18. The method of claim 17, wherein the massive amount of data includes data on the order of zettabytes.

19. The orchestration system of claim 1, wherein the high-bandwidth data transfer strategy is an initial data transfer strategy based on an initial state of the data source, the data sink, and the plurality of network elements and links, and wherein the instructions further enable the processing device to obtain real-time parameters during a current data transfer to further tune or adjust the multiple hardware and software settings of at least one of the data source and the data sink and to perform an auto-scale process based on the size of the communications system.

20. The orchestration system of claim 1, wherein the instructions, when executed, further enable the processing device to obtain the third set of parameters pertaining to the plurality of network elements and links configured along the one or more data paths between the data source and the data sink by obtaining samples of packets between the data source and the data sink.

21. A non-transitory computer-readable medium configured to store computer logic having instructions that, when executed, cause one or more processing devices to:
obtain a first set of parameters pertaining to a data source configured as a first node in a communications system from the data source,
obtain a second set of parameters pertaining to a data sink configured as a second node in the communications system from the data sink,
obtain a third set of parameters pertaining to a plurality of network elements and links configured along one or more data paths between the data source and the data sink from an edge device disposed between the data source and the data sink,
automatically create a high-bandwidth data transfer strategy for transferring a massive amount of data from the data source to the data sink based on the first, second, and third sets of parameters, the high-bandwidth data transfer strategy including configuring multiple hardware and software settings of one or more of the data source and the data sink, and
create an Artificial Intelligence (AI) model that utilizes the high-bandwidth data transfer strategy using a centralized controller and an AI-assisted flow optimizer, wherein the centralized controller is associated with one or more processing devices.

* * * * *